Feb. 6, 1968  R. MAINHARDT  3,367,112
MULTIPLE PLATE ROCKET NOZZLE
Filed Oct. 18, 1965
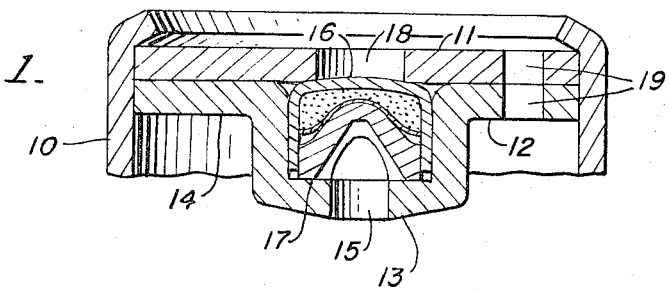
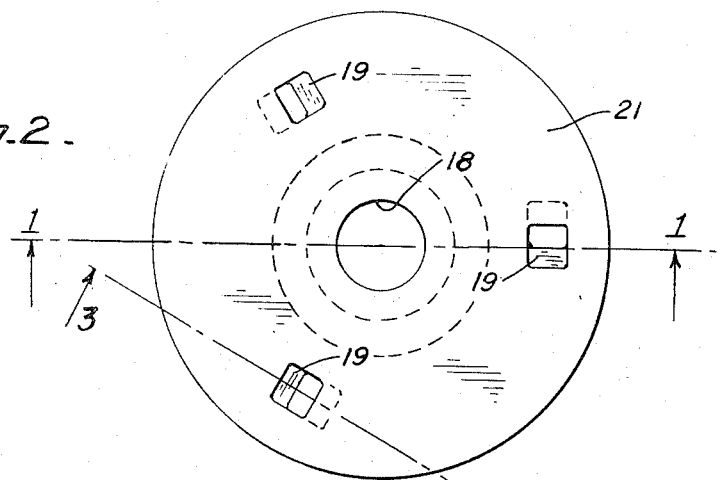
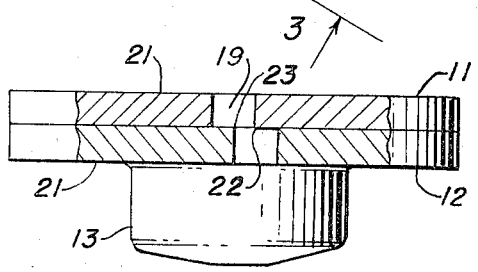
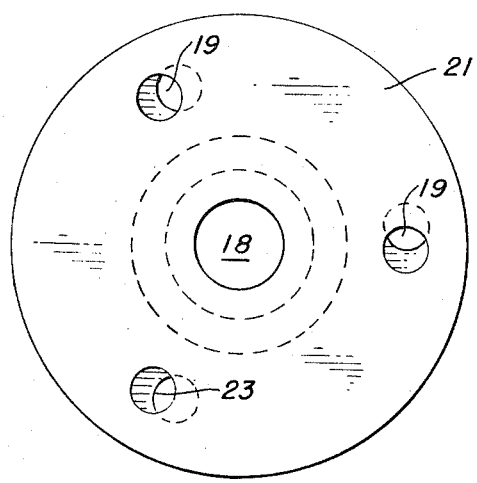
INVENTOR
ROBERT MAINHARDT
BY
Edwin E. Greigg
ATTORNEY 3,367,112
MULTIPLE PLATE ROCKET NOZZLE
Robert Mainhardt, Diablo, Calif., assignor to
MB Associates, a corporation of California
Filed Oct. 18, 1965, Ser. No. 496,906
5 Claims. (Cl. 60—201)

ABSTRACT OF THE DISCLOSURE

This invention relates to a spin stabilized rocket having a nozzle structure including centrally and circularly apertured plates. One plate includes an integral axially disposed cup arranged to receive an igniter, the central aperture in the abutting plate preventing blow-back of the igniter upon firing. The circularly disposed perforations or ports in the several plates are indexed prior to assembly in the rocket casing to provide spin stabilization of the rocket when the exhaust gases issue through the indexed ports.

---

This invention relates to rocket nozzles. More particularly, it relates to a nozzle for imparting spin to a miniature spin stabilized rocket.

Rockets too small to utilize internal guidance or stabilization systems are usually guided to traverse a desired trajectory in one of two ways; they are gyroscopically spin stabilized or they are aerodynamically stabilized by tail fins. The latter means, if fixed fins are used, depends upon a constant oscillation or "hunting" during flight which is a characteristic that causes inaccuracy. This is explainable from basic principles of aerodynamics. When a finned rocket is aligned with the flight path, the center of pressure effected by drag and air resistance is located directly on the nose of the rocket forward of the center of gravity. This creates an inherently unstable condition and the rocket tends to deviate from the line of flight. As the nose swings out of alignment, the exposed frontal area, rearward of the center of gravity, causes the center of pressure to shift from the nose, rearward, to the finned surfaces. The resulting effective pressure on the fins forces the tail back in line behind the nose. The center of pressure then shifts forward to the nose creating the inherently unstable condition once again and starts the cycle over. This continuous transition from stable to untable flight effects a "hunting" condition which exists throughout the flight of a finned rocket.

Spin stabilized rockets, on the other hand, depend upon gyroscopic inertia to maintain their flight trajectory. The principle is the same as used by large sized rockets having internal guidance systems, but instead of an internal spinning gyroscope varying the attitude flight control surfaces, or the individual rocket nozzles, the whole rocket spins with gyroscopic stability. For very small sized rockets having relatively short range, gyroscopic spin effects a more accurate trajectory than aerodynamic stabilization. Thus, if accuracy in a very small sized rocket (on the order of 3/16 to 1 inch in diameter) is an important criteria, it is desirable to provide spin stabilization. This is especially true if the rockets are to be used for anti-personnel use.

A high rate of angular rotation is necessary to stabilize miniature rockets. A major problem in achieving this lies in providing nozzles, or exhaust deflecting means, which will provide the necessary spin rates with the proper angular and linear acceleration characteristics and thrust pulse.

One means for producing the required spin involves utilizing a nozzle configuration which has a multiplicity of canted nozzle ports spaced around the axis of spin in the rear nozzle plate. They work well if designed properly, but most successful designs have generally been very expensive to produce. These canted ports have been made by such processes as drilling, remaining, and multi-step metal swaging; each having its particular advantages. By drilling, the port can be formed to close tolerances. When it is formed with a tapered reamer it can have a diverging cone cross section. If it is formed in a two step process, by "working" the nozzle port once from each side, it can be made with a converging-diverging cross section.

Nozzle ports have been formed by relatively inexpensive processes such as single step punching or piercing but have proved unsatisfactory in many respects. In order to provide the canted port structure in or on the nozzle plates, the exhaust hole must be formed at an angle with respect to the face of the nozzle plate, or a tang must be left overhanging the port to deflect the exhausting gases. Neither of these structures are easy to reproduce accurately by punching or piercing.

Due to the thickness of metal which is necessary for proper heat dissipation, it is very difficult to cleanly or easily form a blank with a canted hole in a single step operation. Likewise, tangs, which are formed to overhang an exhaust port to deflect the gases, are very difficult to reproduce uniformly. None of the presently known manufacturing processes permit a nozzle to be formed from a single blank of metal solely by high speed punching machinery. Thus, the production of reliable and uniform canted port nozzles has, in the past, been relatively expensive.

The present invention is a rocket nozzle for spin stabilized solid propellant rockets in which the nozzle ports can be formed accurately, uniformly, and very inexpensively, solely by punching operations, and it offers a solution to the problems existent heretofore in the prior art. Briefly, it comprises first and second nozzle plates secured adjacent each other; the plates having at least two nozzle ports in each of said plates equally and symmetrically spaced about the central axis thereof; the nozzle ports in the first plate indexed slightly relative to the nozzle ports in the second plate to provide overlapping of the ports to deflect exhaust gases from the rocket motor issuing therethrough. Thus the combustion and propellant gases enter the nozzle port on one axis and leave the exit plane of the nozzle a few degrees removed from the entrance axis imparting an angular impulse moment to the nozzle in traversing the port and effecting the exit.

It is therefore an important object of the present invention to provide an efficient spin producing nozzle for miniature spin stabilized rockets.

It is another object of the present invention to provide a nozzle for miniature spin stabilized rockets which can be formed solely by metal punching.

It is a further object of the present invention to provide converging and/or diverging canted nozzle ports for miniature spin stabilized rockets.

It is still another object of the present invention to provide a nozzle for miniature spin stabilized rockets which is designed to contain the primer between nozzle plates.

It is yet a further object for the present invention to provide a nozzle for a miniature spin stabilized rocket wherein the gas flow characteristics change during flight to reduce the angular rotational pulse and provide greater axial thrust.

Additional objects of the invention will become apparent from the following description of a preferred embodiment of the same taken in conjunction with the accompanying drawing wherein:

FIGURE 1 is a side elevation in section of the rocket nozzle of the present invention taken along lines 1—1;

FIGURE 2 is a plan view of the rocket nozzle;

FIGURE 3 is a side view in elevation of the rocket nozzle partially broken out along line 3—3;

FIGURE 4 is a plan view of an alternative embodiment of the rocket nozzle.

Reference is made to the drawings for the details of the present invention in a preferred form. Shown in FIGURE 1 is an assembled rocket nozzle secured in the rear end of a rocket casing 10. A ring or cover plate 11 is secured adjacent a circular plate 12, of the same size, which has a central cup portion 13 projecting outward therefrom forming a primer cavity and a surrounding flange portion 14. A small hole 15 in the center of the dome forms a gas communication port between the combustion chamber of the rocket and the primer cavity.

The plates must be secured together to provide efficient heat transfer between the plates, otherwise the inner plate cannot dissipate heat fast enough and burns out. Typical metal bonding techniques are suitable and include spot welding, brazing, coining, powdered metallurgy, etc. They also must be assembled properly indexed relative to each other. They can simply be soldered together if they are utilimately secured in the casing with a fit which will prevent them from slipping out of their proper indexed relation since solder will provide the proper molecular intercommunication for the heat transfer. They may even be pressed or jammed together to retain their relationship. Powdered or flaked metal can be placed between the plates before the coining operation to improve the heat transfer in the bond.

Prior to securing the two plates together, a percussion primer 16 is pressed into the central cup portion 13 which projects outward from the circular plate. It is very important that the primer be firmly supported within the primer cavity by ridges 17 around the lower periphery. The primer is activated by a firing pin typical of a small arms weapon. The firing pin strikes the primer through the hole 18 in the center of the ring plate. The edges of the hole overlaps the primer to keep it from blowing itself out of the primer cavity. When the primer is activated, it shoots flame and heat through the communication port 13 to light the igniter in the central bore of the center burning rocket propellant (not shown).

It has proven to be advantageous to assemble the nozzles before positioning them in the rocket casing. This permits the two plates and the primer to be bonded as one unit and effects simpler and more accurate indexing of the nozzle ports 19 during assembly. However, since the primers are press fitted in the circular plates, the nozzles can be partially assembled having only the primers installed in the primer cavities. These are still easily handled, but the partially assembled nozzles are more fragile or vulnerable than fully assembled ones wherein the primer is protected and secured between the ring plate and the circular plate.

Both the circular plate and the ring plate have an equal number of equally and symmetrically spaced nozzle ports located around the face 21 of each plate an equal distance from the center thereof. (By around the face, it is meant in the flange or the flat plate portion.) These ports must be symmetrically arranged to prevent imbalances in the thrust forces. The plates are indexed relative to each other whereby the ports are slightly misaligned. This is seen best in FIGURE 3. Thus as the gases of combustion exit through the ports, they are forced to deviate through the channel formed by the ports at an angle relative to the axis of the rocket. The reaction of the exhausting gases against the sides of the ports in turning the corners imparts an angular moment to the rocket causing it to spin.

The ports can be round, square, oblong, rectangular, or whatever shape desired, so long as the volume, and the area disclosed or "seen" by the exhausting gases, conforms to the design parameters for the rocket. The port formed in the outside plate can be of a slightly larger total volume than the port in the inside plate thereby forming a "rough" diverging port.

It is also a novel feature that the sharp edges, within the port, formed by the exposed adjacent edges 22, 23 of the holes in the two plates, ablate once the rocket propellant starts burning changing the gas flow characteristics. Initially the gas is deflected the greatest amount to provide the largest angular moment to effect flight stability. After the rocket has burned for a short time, the path of exhaust gas flow straightens out permitting less turbulent flow and lessening the angular moment exerted by the gases effecting the exit. Greater axial thrust is thereby created for propelling the rocket. This is a new and advantageous characteristic whereby the gas flow characteristics change to compensate for the changing state of the rocket during flight are not usually obtainable from canted ports.

Generally three or four nozzle ports are used. The more ports used the better stability of the thrust, but the ports have to be smaller to keep the exhaust port exit area within the design limits. Using more ports also makes accurate reproduction more difficult, while increasing the expense of making the dies. The smaller holes reduce the thickness of metal which can be punched due to tools being smaller and weaker. Therefore, three or four ports have proven the most practicable number to use.

Either of the nozzle plates can be used as the outside one by reversing the sizes of the holes in the centers of each of the plates and turning the primer around, but it has been found that having the primer and the circular plate on the inside provides a cleaner external appearance to the rocket for packing and shipment and for positioning in the launcher. It is also possible to make the nozzle from a multiplicity of sandwiched plates utilizing more than two.

FIGURE 4 shows an alternative embodiment of the invention having round ports in the plates. These are often easier to punch in the small sizes as they permit a stronger made die per unit of exit area.

Many advantages in addition to those already related can be realized from the nozzle of the present arrangement which are not available from other known forms of rocket spinning nozzles. One of the primary advantages lies in the ability of this nozzle to be formed completely by punching. Usually when a nozzle plate is formed by this method, the thickness of the plate precludes the use of relatively small holes because the male die is too weak to punch through the thickness of material required to withstand the heat of combustion. Further, forming nozzle ports on an angle or canted, by any process, becomes very difficult because the side loading on the tools, in creating the canted hole, causes them to break more easily than when the axis of the punched hole is at right angles to the plate.

By utilizing two plates to create a nozzle port, smaller ports can be used because the punch need penetrate only one-half the total thickness of the assembled nozzle for each punching operation, and the punch goes straight through the material. Of course, by using additional plates, more and smaller holes can be used, or a larger heat sink can be provided for larger rockets with bigger propellant charges.

The nozzle of the present invention has still further unique qualities. By punching the nozzles from two plates, a converging-diverging nozzle can easily be formed by simply tapering the sides of the male punch for each plate. Similarly the effective areas "seen" by the exhausting gases can be changed for any nozzle by simply changing the indexing of the plates relative to each other to open or close the ports whereby the nozzle is universally adaptable for different length rockets of the same diameter. (A larger rocket produces a greater volume of gas per unit of time if it is of a center burning configuration.)

One of the most important advantages is that the gas flow characteristics have a changing relation which is very desirable in spin stabilized rockets. The ablation of the exposed adjacent inner edges of the nozzle ports causes the port to straighten out and open up thereby decreasing the angular movement and increasing axial thrust. Thus, the rocket has its greatest angular moment imparted to it at the beginning of its flight when it is at its least stable condition. As the rocket accelerates it gains its gyroscopic stability and the power is transitioned from adding angular rotation to producing forward thrust. Due to the relatively low rotational bearing friction of air, the rocket has small angular rotational drag and can afford to use most of the power for axial thrust towards the target once it has stabilized gyroscopically.

A further unique advantage offered by this nozzle design is that it eliminates an assembly operation generally needed to secure the igniter in the rocket. Normally, the igniter must be inserted in position and secured. In the present invention the igniter is simply trapped and securely held between the plates of the nozzle when it is assembled, rather than requiring a separate step in the assembly.

It will be apparent from the foregoing description of the invention, in its preferred form, that it will fulfill all of the objects attributable thereto, and while it has been illustrated and described in considerable detail, the protection is not to be limited to such details as have been illustrated and described except as may be necessitated by the appended claims.

I claim:

1. A spin stabilized solid propellant rocket wherein the improvement comprises:
    a generally cylindrical rocket casing having an end wall,
    a first nozzle plate positioned in said casing, said plate having a flange portion and a central integral perforated cup portion extending into said casing,
    an explosive charge in said cup portion,
    a percussion primer cap surrounding said explosive charge and frictionally engaging said cup portion,
    a plurality of equally spaced exhaust ports located in a circle around the flange portion of said first nozzle plate,
    a second nozzle plate secured in adjacent abutting relation to said first nozzle plate including means defining a central perforation therein and having a face portion opposed to the flange portion of said first nozzle plate, the circumference of the means defining the perforation being smaller than the primer cap to prevent blow-back thereof through said perforation upon ignition,
    exhaust ports in said second nozzle plate corresponding in number to those of said first nozzle plate and equally spaced on a circle of the same diameter as the circle interconnecting the ports in said first nozzle plate, said plates capable of being indexed relative to each other prior to assembly into said casing and flanging the outer wall of said casing around the second nozzle plate whereby said first and second nozzle plates are held in positive abutting relation in the casing.

2. The device of claim 1, wherein the exhaust ports in the second plate forming the exit side of said nozzle are slightly larger than the exhaust ports of the inlet plate forming diverging nozzle ports.

3. A device of the type claimed in claim 1, wherein the first nozzle plate and the second nozzle plate are indexed relative to each other to effect overlapping of the nozzle ports in said plates providing deflected gas flow communication therethrough for causing said rocket to spin.

4. A device of the type claimed in claim 3, wherein the first and second nozzle plates are bonded together in heat transfer relation subsequent to indexing.

5. A device of the type claimed in claim 4, wherein particulate material is interspersed between the first and second nozzle plates prior to bonding.

References Cited
UNITED STATES PATENTS

| | | | |
|---|---|---|---|
| 2,481,059 | 9/1949 | Africano | 60—242 |
| 2,500,117 | 3/1950 | Chandler | 60—201 |
| 2,515,049 | 7/1950 | Lauritsen et al. | 60—263 |
| 2,933,889 | 4/1960 | Tolkmitt | 60—230 |

CARLTON R. CROYLE, *Primary Examiner.*